3,767,613
CARBON BLACK PIGMENTED FLAME RETARD-
ANT THERMOPLASTIC POLYMER COMPOSI-
TIONS STABILIZED AGAINST DEGRADATION
AT POLYMER MELT TEMPERATURES
James S. Dix, Greenville, and Jerry O. Reed, Mauldin,
S.C., assignors to Phillips Petroleum Company
No Drawing. Filed Jan. 28, 1972, Ser. No. 221,791
Int. Cl. C08f 45/08, 45/62
U.S. Cl. 260—41 B                            7 Claims

ABSTRACT OF THE DISCLOSURE

Thermal degradation of carbon black pigmented flame retardant thermoplastic polymer compositions is substantially reduced by sulfur and/or organosulfur compounds.

---

This invention relates to thermally stable carbon black pigmented flame retardant thermoplastic polymer compositions, and to methods of preparing thermally stable carbon black pigmented flame retardant thermoplastic polymer compositions.

Pigmented flame retardant thermoplastic polymer compositions that are noncorrosive to metal processing equipment and exhibit uniform melt flow processing characteristics are highly desirable raw materials for the manufacture of textile products such as carpets, fibers, films and the like. In the formulation of black pigmented flame retardant thermoplastic polymer compositions it has been found that when non-pigmented polymer compositions are combined with carbon black color pigments, the compositions exhibit unusual and undesirable thermal degradation at temperatures commonly employed in molding, extruding and spinning of polymer compositions into finished articles of manufacture. Accordingly because of the economic advantage and in most cases the economic necessity of employing thermally stable polymer compositions of widely varying colors in the production of various articles of manufacture, the search for carbon black pigmented flame retardant polymer compositions having substantially uniform processing characteristics continues.

It is an object of this invention to provide black pigmented flame retardant thermoplastic polymer compositions that exhibit uniform melt flow processing characteristics. Another object is to provide suitable means of combining black pigments and flame retardant thermoplastic polymer compositions. Still another object is to provide black pigmented flame retardant polymer compositions which exhibit melt processing characteristics substantially equivalent to those associated with natural, white, yellow, green, red, blue, or violet colored flame retardant polymer compositions. Still another object is to provide black pigmented flame retardant polymer compositions that are stabilized against melt degradation at processing temperatures employed in melt extrusion of polymers into fibers, films and the like. Other objects of this invention will be apparent from the written description and the appended claims.

According to this invention carbon black pigmented flame retardant thermoplastic polymer compositions containing either sulfur and/or organosulfur compounds are stabilized against thermal degradation. In addition carbon black pigmented flame retardant thermoplastic polymer compositions are stabilized against thermal degradation by admixing with the polymer compositions sulfur and/or sulfur containing compounds.

Among the sulfur and/or sulfur containing compounds that can be employed in the practice of this invention are elemental sulfur in both mono and polyatomic form as well as organic sulfur-containing compounds. The employment of either elemental sulfur and/or organosulfur compounds in intimate admixture with carbon black pigmented flame retardant polymer compositions stabilizes the compositions against thermal degradation.

Any form of elemental sulfur can be employed in the practice of this invention. The sulfur can be employed in various mesh sizes including specially refined grades commonly known in the art as "sublimed (flowers of sulfur)," and should be free of any significant quantity of impurities which would be deleterious to the flame retardant compositions of this invention.

Among the organosulfur compounds that may be employed to stabilize the carbon black pigmented compositions of this invention are various organic compounds which contain sulfur, including organosulfur compounds represented by the formula:

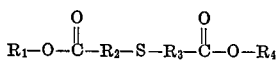

wherein $R_1$ and $R_4$ each independently represent cyclic and acyclic hydrocarbyl radicals such as alkyl, cycloalkyl, aryl radicals and combinations thereof, including aralkyl, alkaryl, cycloalkaryl, arcycloalkyl radicals and the like; $R_2$ and $R_3$ each independently represent divalent acyclic and cyclic hydrocarbyl radicals such as aliphatic, cycloaliphatic, aromatic radicals and combinations thereof. Preferred organosulfur compounds are compounds in accord with the above formula wherein $R_1$ and $R_4$ are aliphatic hydrocarbyl radicals containing from 2 to 26 carbon atoms, more preferably are saturated aliphatic hydrocarbyl radicals containing from 12 to 18 carbon atoms; and $R_2$ and $R_3$ are divalent aliphatic hydrocarbyl radicals containing from 1 to 10 carbon atoms, more preferably are divalent saturated aliphatic hydrocarbyl radicals containing from 2 to 4 carbon atoms.

Representative compounds falling within the description of the organosulfur compounds set out in the general formula above as well as illustrative preferred and more preferred organosulfur compounds are set out hereafter:

dihexylthiodiformate
dicyclohexyl-10,10'-thiodidecylate
dicerotylthiodiformate
dicerotyl-10,10'-thiodidecylate
dioctyl-4,4'-thiodibutyrate
diphenyl-2,2'-thiodiacetate (thiodiglycolate)
dilauryl-3,3'-thiodipropionate
distearyl-3,3'-thiodipropionate
di(p-tolyl)-4,4'-thiodibutyrate
lauryl myristyl-3,3'-thiodipropionate
palmityl stearyl-2,2'-thiodiacetate
dilauryl-2-methyl-2,2'-thiodiacetate
dodecyl 3-(dodecyloxycarbonylmethylthio)propionate
stearyl 4-(myristyloxycarbonylmethylthio)butyrate
diheptyl-4,4'-thiodibenzoate
dicyclohexyl-4,4'-thiodicyclohexanoate
dilauryl-5,5'-thio-4-methylbenzoate mixtures thereof and the like.

Any effective stabilizing amount of elemental sulfur or organic sulfur-containing compound can be employed to stabilize the flame retardant compositions of this invention. For economic reasons, preferably minimum quantities defined herein as at least 0.001 part by weight of sulfur per 100 parts by weight of virgin polymer, is employed. Either elemental sulfur or an organic compound containing sulfur can be employed as the sole stabilizing additive, or combinations consisting of sulfur and such organic sulfur-containing compounds or combinations thereof can be employed. Wherein both sulfur and an organic sulfur-containing compound is present the weight ratio of pure sulfur to the sulfur content of the organic compound can vary widely. The preferred sulfur form is elemental sulfur. When elemental sulfur is employed as the sole stabilizing additive, preferably the sulfur content should be within the range of from about 0.001 to 5.0 parts by weight per 100 parts by weight of virgin polymer. Even more preferred is an elemental sulfur weight range of from about 0.01 to about 2.0 parts per 100 parts by weight of virgin polymer. When an organosulfur compound is employed as the sole stabilizing additive, preferably the sulfur content is within the range of from about 0.05 to about 2.0 parts by weight per 100 parts by weight of virgin polymer. Even more preferred is a sulfur content, contained by the organosulfur compound, within the range of from about 0.1 to about 1.0 part by weight per 100 parts by weight of virgin polymer.

In the preparation of the flame retardant polymer compositions of this invention minimal procedures for admixing the sulfur containing thermal stabilizers with flame retardant polymers can be carried out in the conventional polymer processing equipment which permits intimate admixture of the polymer compositions and additives. Suitable procedures include dry blending of the sulfur containing additives in subdivided form with polymer fluff or powder coupled with subsequent mastication of the polymer at elevated temperatures for a sufficient period of time to intimately admix the polymer composites.

Among the virgin polymers that can be employed in the practice of this invention are homopolymers and copolymers derived from 1-monoolefins having from 2 to 12 carbon atoms. Many of these polymers typically have densities in the range of from 0.8 to .97 per cc. at 25° C., as determined by ASTM method D 1505–68, and flow rates in the range of from 1 to 20, as determined by ASTM method D 1238–65T, although useful polymers are not limited solely thereto. In most instances, the presently preferred polymers are ethylene or propylene homopolymers, or are copolymers of ethylene or propylene with minor amounts of monomers copolymerizable therewith such as ethylene or propylene, butene-1, hexene-1, octene-1, and the like. Polymers wherein at least 50 mole percent is derived from polymerization of ethylene or propylene monomeric units are preferred. Even more preferred are polyolefinic compositions containing at least 90 mole percent of ethylene or propylene derived monomeric units. Of even more importance are polyolefins containing at least 90 mole percent propylene and from about 0.5 to 10 mole percent of a comonomer selected from ethylene or butene-1, since such polymers are preferably employed in the manufacture of textile products including carpets, fibers and films.

Among the flame retardant additives which can be employed in the practice of this invention are halogenated organic compounds, preferably halogenated cycloalkanes or halogenated bis-cycloalkylalkanes. These additives are generally employed in amounts of from 1 to 20, preferably from 1.5 to 3 parts by weight of additive per 100 parts by weight of polymer.

Preferred halogenated cycloalkane compounds are represented by the formula:

(III) $\quad X_m-A-R'''-A-X_o$
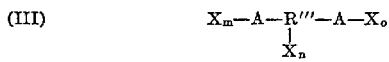

wherein A is a saturated cycloaliphatic group having from 5 to 8 carbon atoms in the ring, X represents chlorine and/or bromine substituents attached to a carbon atom of the ring represented by A, or attached to a carbon atom of a saturated acyclic hydrocarbon radical, having from 1 to 4 carbon atoms represented by $R'''$, having a valence of $n+2$; and $m$, $n$, and $o$ are 0 or integers which are selected such that the halogen content of the compound is sufficient to impart flame retardancy to polyolefinic compositions. Presently preferred type III compounds are those which have a total halogen content of at least about 30 weight percent, more preferably from about 30 to about 90 weight percent, of the total weight of the compound. Representative examples of suitable compounds include:

bis(2,5-dibromocyclopentyl)dibromomethane
1,2-bis(3,4-dichlorocyclohexyl)-1,2-dichloroethane
1,2-bis(3,4-dibromocyclohexyl)-1,2-dibromoethane
1-(3,5-dibromocyclohexyl)-2-(3,5-dichlorocyclohexyl)ethane
bis(2,4,6-tribromocycloheptyl)methane
1,3-bis(3,5,7-trichlorocyclooctyl)-2,2-dibromopropane
2,3-bis(2,3,4,5,6-pentachlorocyclohexyl)-1,4-dibromobutane
1,4-bis(2,3,4,5,6,7,8-heptabromocyclooctyl)-1,2,3,4-tetrabromobutane
1-(2,5-dichlorocyclopentyl)-2-(3,4-dibromocyclohexyl)-3-bromopropane
1,3-bis(3,4,5-tribromocyclohexyl)-2-dibromomethylpropane and the like, and admixtures thereof.

Another preferred group of flame retardant additives are halogenated saturated cycloaliphatic compounds represented by the formula:

(IV)

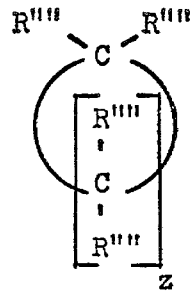

wherein individually each $R''''$ represents hydrogen, chlorine, bromine or a saturated aliphatic hydrocarbyl radical having from 1 to 4 carbon atoms; and $z$ is an integer of 5 to 11, with $z$ equal to the integer 11 being presently preferred. The individual compounds represented by Formula IV can have up to about 20 carbon atoms overall.

The halogen content of compounds of Formula IV should be sufficient to impart flame retardancy to the polymer composition with which it is incorporated in minor effective amount; presently preferred is a halogen content of at least about 30 weight percent. The number of halogen atoms will generally range from 1 to 6.

Examples of halogenated additives represented by Formula IV include cyclic dimers and trimers of butadiene or substituted butadiene in which the double bonds have been saturated by addition of chlorine or bromine. Illustrative compounds included by the formula are:

1,2,3,4-tetrachlorocyclooctane
1,2,5,6-tetrabromocyclooctane
1,2,5,6,9,10-hexabromocyclododecane
1,2-dichloro-5,6,9,10-tetrabromocyclododecane
bromocyclohexane
1,2-dichloro-4-propylcyclohexane
1,4-dichlorocyclohexane
1,2-dibromo-4,5-dibutylcycloheptane
1,2-dibromocyclononane
1,2-dibromo-4,6-diethylcyclohexane
1,2-dibromo-4-methyl-6,8,10-triisopropylcyclodecane and the like.

Of course, as to either flame retardant additives (III) or (IV) above, an admixture of two or more of either compound type or different compounds of the same type can be employed such that in the resulting admixture the average value of any of $m$, $n$, $o$, $z$ could be a non-integer. The flame retardant additive (III) or (IV), or a mixture thereof, is used in an amount in admixture with the polymeric composition such that the total available halogen, i.e., from the additive, in the formulation is at least about 0.2 weight percent of the total formulation.

While the foregoing types of additives are preferred within the concept of our invention, the general term "flame retardant additive" includes any known halogenated flameproofing or flame retarding agent or mixtures thereof which can be incorporated with thermoplastic polymers so as to provide the necessary flameproofing or flame retarding effects.

Among the metal oxides that can be employed in conjunction with halogenated organic compounds to improve the efficiency of the flame retardant additive are arsenic trioxide, antimony trioxide and bismuth trioxide. Antimony oxide, preferably as the trioxide, is preferably employed along with the halogenated additive in order to enhance the effectiveness of the organic flame retardant. From about 0.5 to 20 parts of antimony oxide can be used per 100 parts of polymer. A weight ratio of halogenated additive to antimony oxide of from 0.5:1 to 5:1 is generally acceptable, however a ratio of about 2:1 is preferred. Bismuth oxide and arsenic trioxide are considered the equivalent of antimony trioxide for this purpose, but are less frequently employed in the preparation of commercial polymer formulation.

Among the corrosion inhibiting additives that can be employed is an organotin salt of a mercapto-substituted acid which can be represented by the formula:

(V)
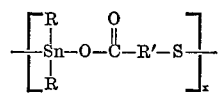

wherein each R is a radical, preferably hydrocarbyl, having from 1 to 12 carbon atoms including alkyl, cycloalkyl, aryl radicals, or combination thereof such as alkaryl, arylalkyl, cycloalkylaryl, arylcycloalkyl, and the like; R preferably is an alkyl radical having from 2 to 8 carbon atoms; R' is a divalent radical, preferably hydrocarbon, having from 1 to 12 carbon atoms, including alkylene, cycloalkylene, arylene, alkenylene, cycloalkenylene, including combinations thereof, such as alkylenecycloalkylene and arylenedialkylene, and the like; and $x$ is an integer from 2 to 30, preferably from 4 to 20.

Exemplary corrosion inhibiting additives of the organotin salts of mercapto-substituted carboxylic acids are those compounds represented by Formula V in which each R is individually selected from the group consisting of methyl, ethyl, butyl, isobutyl, hexyl, octyl, dodecyl, cyclohexyl, phenyl, benzyl, or any of the tolyls; and R' is selected from the group consisting of methylene, ethylene, propylene, tetramethylene, octamethylene, dodecamethylene, 1,4-cyclohexylene, o-phenylene, 2-butylene, 1,4-cyclohex-2-enylene, 1,3-cyclopentylenedimethylene, p-phenylenedimethylene, and the like. Of course, any of the radicals can have other non-interfering substituents such as one or more halogens such as chlorine, bromine, or the like, without changing the character or scope of the additives represented by Formula V. Any effective amount of corrosion inhibitive additive can be employed. In general, amounts within the range of from 0.01 php. to 5 php., preferably from 0.03 to 0.5 php., i.e., parts of additive per 100 parts of polymer are employed.

Among the color inhibitors that can be employed are organotin salts of an olefinically unsaturated diacid which can be represented by the formula:

(VI)
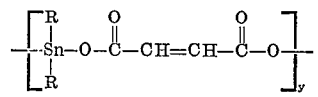

wherein independently each R is as defined with respect to the corrosion inhibitive additive (V) formula R groups referenced hereinbefore; and $y$ is an integer from 1 to 30, preferably from 1 to 3. Any effective amount of color inhibitive additive (VI) can be employed. In general, amounts in the range of from 0.05 php. to 5 php., preferably from 0.10 to 1 php., i.e., parts of additive per 100 parts of polymer are employed.

Of course, Compounds V or VI, or an admixture of either type, or of each, the average value of any of $x$ or $y$ can be a non-integer. For example, two or more species of (V) in admixture could have an average $x$ value such as 6.3.

Set out hereafter are examples which illustrate applicants' invention. Included are examples of the best mode of practicing the invention, which are not to be considered as unduly limitative.

EXAMPLE I

Nonpigmented (Case 1) and pigmented (Cases 2–5) polymer compositions were prepared containing (1) virgin polypropylene; (2) flame retardant, i.e., 1,2-bis(3,4-dibromocyclohexyl)-1,2-dibromoethane; (3) a metal oxide, i.e., antimony trioxide; (4) a corrosion inhibitor, i.e., a polymeric dibutyl tin modified mercaptide in accord to formula set out hereinbefore, wherein $x$ equals approximately 6.3; (5) a color inhibitor, i.e., an organotin containing no sulfur according to formula hereinabove wherein $y$ equaled approximately 2; (6) a thermal antioxidant, i.e., octadecyl[3-(3,5-di-t-butyl-4-hydroxyphenyl)]-propionate; and (7) an ultraviolet light stabilizer, i.e. 2',4'-di-t-butylphenyl 3,5-di-t-butyl-4-hydroxybenzoate. Each ingredient of the polymer compositions is reported on a weight basis.

TABLE I

| Pigment color chemical ingredients | Natural, Case 1 | Black, Case 2 | White, Case 3 | Yellow, Case 4 | Red, Case 5 |
|---|---|---|---|---|---|
| Polypropylene [1] | 100.0 | 100.0 | 100.0 | 100.0 | 100.0 |
| Flame retardant | 2.0 | 2.0 | 2.0 | 2.0 | 2.0 |
| Metal oxide | 1.0 | 1.0 | 1.0 | 1.0 | 1.0 |
| Thermal antioxidant | 0.1 | 0.1 | 0.1 | 0.1 | 0.1 |
| UV stabilizer | 0.4 | 0.4 | 0.4 | 0.4 | 0.4 |
| Color inhibitor | 0.6 | 0.6 | 0.6 | 0.6 | 0.6 |
| Corrosion inhibitor | 0.1 | 0.1 | 0.1 | 0 1. | 0.1 |
| Pigment | 0.0 | 1.0 | 1.0 | 1.0 | 1.0 |

[1] Containing trace or residual quantities of the 2,6-di-t-butyl-4-methylphenol antioxidant customarily employed in the art to stabilizer polyolefins during processing in amounts estimated to be less than 0.02 parts per 100 parts of polymer.

The composition of the pigments employed in Cases 2–5 correlated with various industry standards is summarized hereafter:

| Pigmentation | Pigment color | | | |
|---|---|---|---|---|
| | Black | White | Yellow | Red |
| (a) Type | Channel carbon black | Titaniumdioxide | Azo condensation yellow 3G. | Red 2R. |
| Weight percent | 89 | 100 | 100 | 100. |
| (b) Type | Phthalocyanine blue | | | |
| Weight percent | 11 | | | |
| Color index number [1] | Blue 7 | White 6 | | |
| Color index designation [2] | | | Yellow 93 | |

[1] Color index, 2nd Ed., 1956, Society of Dyers and Colourists of The American Association of Textile Chemists and Colourists.
[2] Encyclopedia of Polymer Science, vol. 10, Interscience Publishers, a Division of John Wiley & Sons, Inc., Library of Congress, Catalog No. 64-22188.

The polymer compositions set out above were evaluated by melt flow extrudate tests wherein the difference (Δ) in the melt flow characteristics of the polypropylene in the respective cases was compared with the melt flow of the polymer compositions after addition of the various chemical ingredients, both prior to and after being spun into fibers. The melt flow testing was carried out in accordance with ASTM test procedure ASTM D 1238–62T, Condition L.

TABLE II

| Δ melt flow extrudate values fiber spinning conditions, temp., °F./min. | Case 1 | Case 2 | Case 3 | Case 4 | Case 5 |
|---|---|---|---|---|---|
| 500° F/3.4 min | 4.2 | 12.6 | 5.0 | 6.5 | 8.6 |
| 500° F/5.1 min | 6.4 | 19.6 | 7.4 | 8.9 | 14.2 |
| 525° F/3.4 min | 10.6 | 31.6 | 21.2 | 14.9 | 19.8 |
| 525° F/5.1 min | 21.0 | 43.6 | 20.4 | 18.3 | 36.1 |

The above melt flow extrudate values of Table II illustrate that carbon black pigmented compositions are thermally unstable in comparison to natural and other non-pigmented carbon black polymer compositions, since the larger the number the more severe the polymer degradation.

EXAMPLE II

Sulfur and organosulfur compounds wherein both the sulfur and organosulfur compounds are employed as the sole additive and combinations including both the sulfur in elemental form and organosulfur compound form, were combined with carbon black pigmented flame retardant polymer compositions (described in Case 2, Example 1) in order to determine the effectiveness of the sulfur additives in stabilizing the thermal degradation of the polymer compositions set out hereinafter in Cases 8–15. Case 7 was a controlled case employing the composition of Case 2, Example 1, which is free of either sulfur and/or organosulfur compound. Case 6 was a control employing a polymer composition similar to Case 2, Example 1, with the provision that the color inhibitor and corrosion inhibitors were not included in the polymer composition. The compositions of Cases 6–15, Table III, were evaluated for thermal stability according to the general melt flow extrudate tests described in Example 1. The results are set forth in Table IV.

TABLE III

| Sulfur stabilizer additive | Case 6 | Case 7 | Case 8 | Case 9 | Case 10 |
|---|---|---|---|---|---|
| Elemental sulfur | 0.0 | 0.0 | 0.05 | 0.1 | 0.4 |
| DSTDP [1] | 0.0 | 0.0 | 0.0 | 0.0 | 0.0 |

| | Case 11 | Case 12 | Case 13 | Case 14 | Case 15 |
|---|---|---|---|---|---|
| Elemental sulfur | 0.0 | 0.0 | 0.02 | 0.05 | 0.1 |
| DSTDP [1] | 0.2 | 0.5 | 0.2 | 0.2 | 0.2 |

[1] Distearyl-3,3'-thiodipropionate.

TABLE IV

| Melt flow extrudate values [1] melt flow test conditions temp., °F./min. | Case 6 | Case 7 | Case 8 | Case 9 | Case 10 |
|---|---|---|---|---|---|
| 490° F./5 min | 0.059 | 0.219 | 0.104 | 0.088 | 0.087 |
| 490° F./10 min | 0.084 | 0.523 | 0.247 | 0.213 | 0.118 |

| | Case 11 | Case 12 | Case 13 | Case 14 | Case 15 |
|---|---|---|---|---|---|
| 490° F./5 min | 0.200 | 0.183 | 0.128 | 0.103 | 0.109 |
| 490° F./10 min | 0.365 | 0.351 | 0.301 | 0.246 | 0.227 |

[1] Weights in grams of one minute cut after indicated length of time using 325 gram load.

The above melt flow data illustrates that the thermal stabilizing additives both elemental and organosulfur compounds effectively stabilize carbon black pigmented polymer compositions when minimal quantities are employed. The data also illustrates that the amount of thermal stabilization improves as the sulfur content of the polymer compositions is increased regardless of whether or not the sulfur is in elemental or organic compound form.

In addition, the above data also illustrates that corrosion and color inhibitors which are employed in flame retardant polymer compositions deleteriously effect melt flow properties of carbon black pigmented polymer compositions in the absence of the sulfur containing additives of this invention.

The term carbon black as employed in the description of the thermoplastic polymer compositions of this invention is descriptive of any type of carbon black including carbon black types produced in accordance with furnace, impingement, thermal, lampblack, and acetylene carbon black processes. Preferred carbon black pigments in accordance with this invention are carbon black types having an average particle diameter of 100 angstroms to about 700 angstroms.

Further modifications of the teachings of this invention by the use of elemental sulfur and organosulfur compounds to impart thermal stability to flame retardant thermoplastic polymer compositions will be apparent to those skilled in the art.

We claim:

1. A composition comprising a thermoplastic polymer selected from homopolymers and copolymers derived from 1-monoolefins having from 2 to 12 carbon atoms; a flame retardant amount of a halogenated organic compound; a carbon black pigment; an effective stabilizing amount of a thermal stabilizer selected from elemental sulfur, or an organosulfur compound represented by the formula:

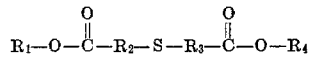

wherein $R_1$ and $R_4$ each independently represent cyclic and acyclic hydrocarbyl radicals, and $R_2$ and $R_3$ each independently represent divalent acyclic and cyclic hydrocarbyl radicals or combinations of said elemental sulfur and said organosulfur compounds; an effective amount of a corrosion inhibitor represented by the formula:

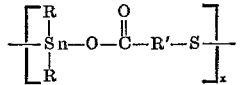

wherein each R is independently selected from hydrocarbyl radicals containing 1 to 12 carbon atoms, each R' is independently selected from a divalent hydrocarbyl radical containing 1 to 12 carbon atoms, and $x$ is an integer of 2 to 30; and an effective amount of a color inhibitor represented by the formula

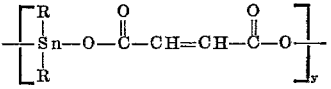

wherein each R is independently selected from hydrocarbyl radicals containing 1 to 12 carbon atoms and $y$ is an integer of 1 to 30.

2. A composition in accord with claim 1 wherein said $R_1$ and $R_4$ radicals represent aliphatic hydrocarbyl radicals containing from 2–26 carbon atoms, and said $R_2$ and $R_3$ radicals are divalent aliphatic hydrocarbyl radicals containing from 1–10 carbon atoms.

3. A composition in accord with claim 1 wherein said polymers contain at least 90 mole percent propylene derived monomeric units.

4. A composition in accord with claim 1 wherein said polymer contains at least 90 mole percent propylene and at least 0.5 to 10 mole percent ethylene and butene-1 derived monomeric units.

5. A composition in accord with claim 1 containing as a sole effective thermal stabilizing additive elemental sulfur.

6. A composition in accord with claim 1 wherein said thermal stabilizer is present in an amount of from about 0.001 to 5.0 parts of elemental sulfur per 100 parts of polymer in combination with from about 0.01 to about 2.0 parts of an organosulfur compound per 100 parts of polymer.

7. A composition in accord with claim 1, wherein said polymer contains at least 90 mole percent propylene-derived monomeric units, a metal oxide selected from arsenic trioxide, antimony trioxide or bismuth trioxide, and wherein said thermally stabilizing additive is present in an amount of at least 0.001 part by weight of sulfur per 100 parts of polymer.

References Cited

UNITED STATES PATENTS

| | | | |
|---|---|---|---|
| 3,660,533 | 5/1972 | Drake et al. | 260—878 B |
| 2,982,756 | 5/1961 | Mercier et al. | 260—45.7 |
| 3,432,461 | 3/1969 | Hill et al. | 260—45.75 K |
| 3,717,609 | 2/1973 | Kutner | 260—45.75 K |

FOREIGN PATENTS

| | | | |
|---|---|---|---|
| 928,650 | 6/1963 | Great Britain | 260—41 |

MORRIS LIEBMAN, Primary Examiner

J. H. DERRINGTON, Assistant Examiner

U.S. Cl. X.R.

260—41 R, 45.7 R, 45.7 S, 45.75 K, 45.85